Sept. 9, 1969   KAZUO KITAZAWA   3,466,008
BUTTERFLY VALVE
Filed Oct. 26, 1967   2 Sheets-Sheet 2
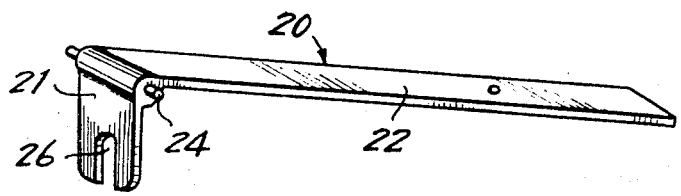
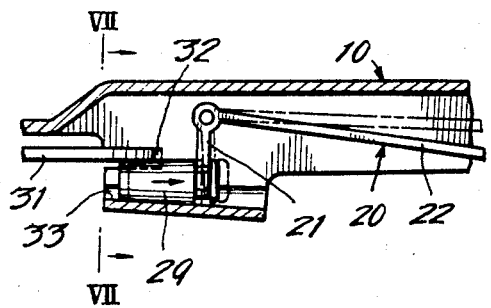 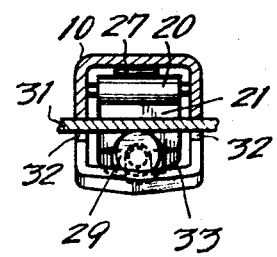
INVENTOR
Kazuo Kitazawa
BY Beaman & Beaman
ATTORNEYS United States Patent Office 3,466,008
Patented Sept. 9, 1969

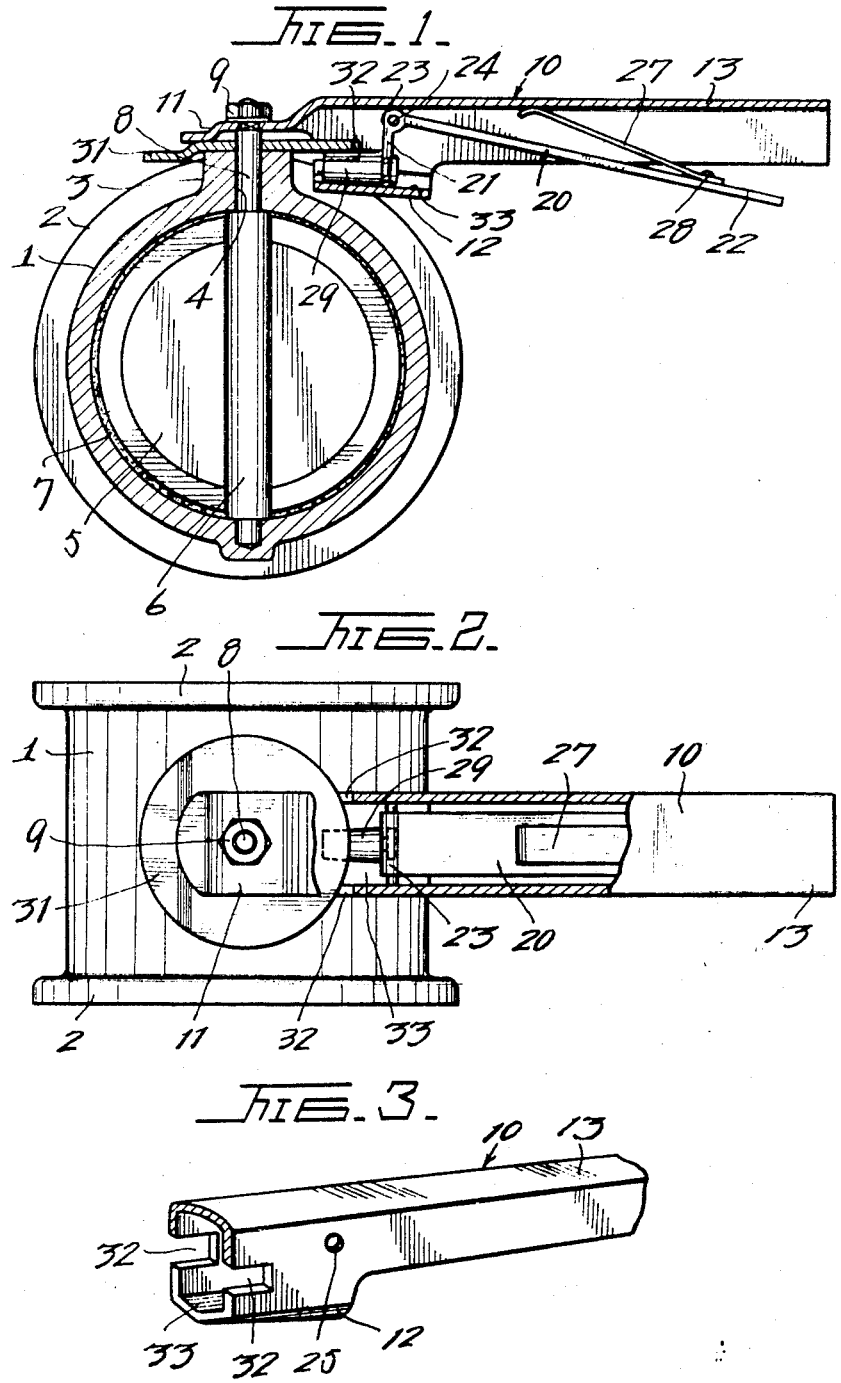

3,466,008
BUTTERFLY VALVE
Kazuo Kitazawa, 21–13 2-chome, Ohara, Setagaya-ku,
Tokyo, Japan
Filed Oct. 26, 1967, Ser. No. 678,305
Claims priority, application Japan, July 17, 1967,
42/45,632
Int. Cl. F16k 31/528, 5/00
U.S. Cl. 251—297                             5 Claims

ABSTRACT OF THE DISCLOSURE

A butterfly valve or the like comprising a hollow flanged cylindrical body, a disc member disposed within said body extending across the interior of the body for rotational movement between valve opening and closing positions, an annular packing disposed around said disc member, a vertical shaft extending diametrically of said body, packing and disc member in a vertical plane which passes through the diameters of the body, packing and disc member and adapted to rotate about its longitudinal axis so as to rotate said disc member together with itself, a manual hollow operation handle rotationally mounted on said body and laterally extending from one side of the latter for rotating said shaft and a handle braking device operatively mounted within said handle and comprising a wedge actuating spring-loaded lever pivotally supported by said handle, a frusto-conical wedge member supported by said lever for longitudinal sliding movement together with said lever and for lateral sliding movement relative to said lever, and a brake disk fixedly mounted on said body and adapted to releasably hold said frusto-conical wedge member in position.

BACKGROUND OF THE INVENTION

Various types of butterfly valves have been proposed and practically employed in a piping system which is adapted to transport hydraulic fluid under high pressure in order to control the flow of such fluid passing through the pipes which are connected to each other by the valves in the piping system and most of these butterfly valves are provided with manually-actuated operation handles by the manipulation of which the valves may be full or partially opened or perfectly closed as desired or necessitated so that the fluid is allowed to pass through the piping system without restriction or at varying controlled rates or such flow of the fluid can be perfectly obstructed. However, none of the conventional butterfly valves provided with such manually actuated operation handles are perfectly satisfactory because the conventional butterfly valve handles can not firmly hold the component parts of the valves in their respectively intended proper positions and accordingly, when the component parts of such valves are subjected to the high pressure of the hydraulic fluid which acts on them as the fluid passes through the piping system wherein the butterfly valves are installed, the parts are inevitably caused to be more or less dislocated resulting in any undesired relation between the parts. As a result, the conventional butterfly valves can not be expected to satisfactorily perform their intended functions.

SUMMARY OF THE INVENTION

The present invention relates to a novel and improved butterfly valve or the like, and more particularly to a novel and improved braking device for the manual operation handle of a butterfly valve or the like to be installed in a piping system adapted to transport hydraulic fluid under high pressure which can perfectly brake the handle in any desired position so that the component parts of the butterfly valve may be firmly and properly held in position regardless of the hydraulic pressure acting on them.

Therefore, one object of the present invention is to provide a novel and improved braking device for the manual operation handle of a butterfly valve or the like which can perfectly brake the handle in any desired position so that when the handle is gripped and turned in either direction to fully or partially open or perfectly close the valve and then the handle is released from the gripping, the handle can be instantly and positively held in the position to which the handle now assumes.

Another object of thep resent invention is to provide a braking device for the manual operation handle of a butterfly valve or the like which can be easily and simply operated.

Another object of the present invention is to provide a braking device for the manual operation handle of a butterfly valve or the like which comprises a relatively small number of component parts having relatively simple constructions and arrangements and accordingly, can be easily constructed with less expenses.

A further object of the present invention is tó provide an efficient and reliable braking device for the manual operation handle of a butterfly valve or the like which can positively hold the handle in any desired position and accordingly, can hold the component parts of the valve in their respectively intended proper positions depending upon the position of the handle in which the same is positively held.

According to the present invention, there is provided a butterfly valve or the like comprising a hollow cylindrical flanged body to be connected at the opposite ends to pipes in a piping system adapted to transport hydraulic fluid under high pressure; a disc member rotationally disposed within said body extending across the interior of the body at right angles to the longitudinal axis of the latter for rotational movement between valve opening and closing positions; an annular packing disposed around the outer periphery of said disc member and adapted to provide a fluid-tight sealing between the inner periphery of said body and the outer periphery of said disc member; a vertical shaft extending diametrically of said body, packing and disc member in a vertical plane which passes through the diameters of the body, packing and disc member in a vertical plane which passes through the diameters of the body, packing and disc member with the upper end projecting above the top of said body and the lower end rotationally received in the bottom of the body and adapted to rotate about its longitudinal axis so as to rotate said disc member together with itself; and an elongated hollow manual operation handle rotationally mounted on said body on the top of the latter snugly surrounding said projecting upper end portion of the vertical shaft for rotating said shaft and disc member and laterally and horizontally extending from one side of the body; characterized by the provision of a braking device for said operation handle comprising a spring-loaded wedge actuating means pivoted to and within said handle in an intermediate portion between the opposite ends of the handle; wedge means carried by said wedge actuating means at one end of the latter for sliding movement in the longitudinal direction of said handle together with said actuating means and for lateral and rotational slidiñg movement relative to said wedge actuating means; and a stationary brake disc held in position between said top of the body and one end of said handle and adapted to releasably hold said wedge means in cooperation with said intermediate portion of the handle.

The above and other objects and advantages of the present invention will be more readily apparent to those skilled in the art from the following description of a butterfly valve which incorporates therein a preferred form of braking device embodying the present invention when read in conjunction with the accompanying drawings which forms part of the specification.

BRIEF DESCRIPTION OF THE DRAWINGS

FIG. 1 is a fragmentary vertically sectional view of an upper portion of a butterfly valve which incorporates a preferred form of braking device therein and which also shows the manual hollow operation handle of said valve in longitudinal section and said braking device for the handle in partial side elevation and in partial section;

FIG. 2 is a fragmentary top plan view of a portion of said butterfly valve, said handle and said braking device with the top wall of the handle partially broken away;

FIG. 3 is a fragmentary perspective view of an intermediate portion of said operation handle in partial section especially showing the arrangement of a pair of brake plate receiving notches formed at the fore end of said intermediate handle portion and the configuration of the inner surface formed in the bottom wall of the intermediate handle portion along which a frusto-conical wedge member of said braking device is adapted to slidably move in the longitudinal direction and slidably rotate in the lateral direction thereof;

FIG. 4 is a fragmentary perspective view of a portion of a spring-loaded lever of said braking device;

FIG. 5 is a fragmentary perspective view of said frusto-conical wedge member;

FIG. 6 is a fragmentary longitudinally sectional view of said intermediate handle portion especially showing the manner in which said wedge member slidably moves in the longitudinal direction along the inner bottom surface of said intermediate handle portion as said lever is pivoted about its pivot support; and FIG. 7 is a cross-sectional view taken substantially along the line VII—VII of FIG. 6 and as seen in the arrow direction of said especially showing the manner in which said wedge member slidably and laterally rotates along the inner bottom surface of said intermediate handle portion.

PREFERRED EMBODIMENT OF THE INVENTION

The present invention will be now described referring to the accompanying drawings in which a portion of a butterfly valve to be installed in a piping system adapted to transport hydraulic fluid under high pressure and incorporating therein a preferred form of braking device embodying the present invention is illustrated. Although the invention will be described in connection with controlling the operation handle for the illustrated butterfly valve, it will be understood that the invention can be equally applied for controlling the operation handle of any other similar valve and the following description is for illustration only, but not for limiting the application of the novel braking device only to such a butterfly valve. Since the butterfly valve itself is conventional, description of the butterfly valve will be made on only parts which are directly related to the operation of the novel handle braking device hereinafter. The butterfly valve generally comprises as its principal component parts a hollow cylindrical body 1 provided at the opposite ends with flanges 2 and 2 (only one flange is shown in FIG. 1) to be connected to adjacent pipes (not shown) in a piping system adapted to transport hydraulic fluid under high pressure and the body is also provided in diametrically opposite points of the outer periphery between the opposite end flanges 2 with top and bottom bosses 3 and 3 having center bores 4 and 4, respectively (only the top boss and the associated center bore are shown in FIG. 1). A disc member 5 is rotationally disposed within the body 1 vertically extending across the interior of the body at right angles to the longitudinal axis of the latter in substantial alignment with the top and bottom bosses 3 for rotational movement between valve opening and closing positions and the disc member is provided with a center bore (not shown) extending across the diameter of the disc in alignment with the center bores 4 in the top and bottom bosses 3. The center bore in the disc member 5 is formed by a pair of vertically extending elongated raised portions 6 and 6 (only one raised portion is shown in FIG. 1) which outwardly project from the opposite sides of the disc member 5. An annular packing 7 is disposed around the outer periphery of the disc member 5 and the packing is also provided with a pair of diametrically opposite bores (not shown) in alignment with the bores 4 in the body bosses 3 and with the center bore in the disc member 5. The annular packing 7 provides a fluid-tight sealing between the inner periphery of the body 1 and the outer periphery of the disc member 5. A rotary shaft 8 vertically extends through the bores 4 in the body bosses 3, the bores in the annular packing 7 and the center bore in the disc member 5. The upper end portion of the shaft 8 projects above the top boss 3 in the body 1 and the extreme upper end of the projecting upper shaft portion is threaded for receiving a hexagonal nut 9 thereon and the lower end of the shaft 8 (not shown) is loosely received in the wall at the bottom of the body 1 so that the shaft may be rotated relative to the body 1 said shaft being further provided immediately below the threaded extreme end with a polygonal handle receiving portion (not shown). The diameter of the center bore in the disc member 5 and that of the shaft 8 are so selected that the center bore in the disc member 5 snugly receives the shaft 8 whereby when the shaft is rotated in either direction the disc member carrying the packing 7 thereon can rotate together with the shaft. An operation handle 10 is received at the fore end portion 11 having a polygonal opening (not shown) mating with the polygonal portion of the shaft 8 on the shaft and the handle laterally and horizontally extends from one side of the body 1. The operation handle 10 consists of the fore end portion 11 in a multi-bent plate shape, an integral box shape intermediate portion 12 and an integral rear portion or hand grip portion 13 having a reversed U-shape cross section. The above-mentioned nut 9 holds the handle 10 on the shaft 8 and the handle can be manually and horizontally turned in either direction so as to rotate the shaft 8 which in turn rotates the disc member 5 resulting in opening or closing the valve. The above-mentioned constructions, arrangements and functions of the component parts of the butterfly valve are conventional and well known in the art and further detailed descriptions of these parts will not be necessary.

According to the present invention, a novel braking device for controlling or braking the operation handle 10 of the butterfly valve referred to above is incorporated in the valve. The braking device generally comprises a L-shape lever 20 having a shorter arm 21 downwardly extending within the intermediate handle portion 12 and an integral longer arm 22 extending rearwardly and downwardly through the open bottom of the rear handle portion 13 out of the latter. The shorter arm 21 and the longer arm 22 are connected to each other at a point shown with reference numeral 23 where a transverse bore is formed and a transverse pivot pin 24 loosely extends through the transverse bore with the opposite ends projecting through and supported in a pair of aligned bores 25 and 25 in the side walls of the intermediate handle portion 12 (only one bore is shown in FIG. 3) whereby the lever 20 may be pivoted about the pivot pin 24. The shorter arm 21 is formed in the center of the lower or free end with a notch 26 having a substantially semi-circular shape for the purpose to be described in detail hereinbelow. The longer arm 22 is normally urged downwardly by means of a leaf spring 27 which has one end anchored to the inner surface of the top wall of the rear handle portion 13 and the other end of the spring is secured by means of a rivet 28, for example, to the upper surface of the longer arm 22. In the position of the lever 20 as shown in FIG. 1 where the longer lever arm 22 is shown as being in the lowest position, the butterfly valve is in fully closed position. A frusto-conical wedge member 29 having an intermediate constricted or reduced diameter neck portion 30 between the opposite ends is rotationally received in the semi-circular notch 26 in the shorter lever arm 21. A brake disc 31 having a bore (not shown), which is in alignment with the bores in the top body boss 3 and in the fore handle portion 11, is held in position between the top body boss 3 and the fore handle portion 11 surrounding the shaft 8. Portion of the peripheral edge of the brake disc 31 (the right side edge portion as seen in FIG. 1) extends into the intermediate handle portion 12 and abuts against the frust-conical wedge member 29 within the intermediate handle portion 12. The box-shape intermediate handle portion 12 has a pair of aligned side notches 32 and 32 formed extending through the fore end wall thereof into the side walls of the associated handle portion by a short distance for receiving the peripheral edge portion of the brake disc 31 extending therein. The bottom wall of the box-shape intermediate handle portion 12 forms sliding guiding way 33 for the wedge member 29 in the intermediate handle portion 12. The wedge member guiding way 33 is smoothly tapered rearwardly or inwardly and downwardly corresponding to the taper of the frusto-conical wedge member 29 as more clearly shown in FIG. 6 and also smoothly tapered in the transverse direction as more clearly shown in FIG. 7. The configuration of the transverse taper in the wedge member guiding way 33 is such that the guide way may have a substantially triangular cross-section with the rounded apex or center positioned on the lowest level and outwardly and upwardly sloping on the opposite sides of the apex whereby the frusto-conical wedge member 29 may maintain at all times in sliding contact with the guiding way 33 as the wedge member rolls sidewise on the guiding way. Thus, it will be understood that as the spring-loaded lever 20 is gripped and caused to pivot about the pivot pin 24 in the counter-clock direction against the force of the leaf spring 27, the frusto-conical wedge member 29 carried by the shorter lever arm 21 is released from the abutting engagement by the brake disc 31 and moved backwards or retreated within the intermediate handle portion 12 while smoothly sliding along the longitudinally tapered surface of the guideway. In FIG. 6, the lever 20 is shown in the dotted line position after the same has pivoted in the counter-clock direction by a certain angular distance and the wedge member 29 carried by the lever is also shown in the dotted line position after the same has retreated by a linear distance corresponding to the angular displacement of the lever. After the lever 20 and the wedge member 29 have reached the dotted line positions of FIG. 6, if the handle 10 is turned in either direction while maintaining the lever and the wedge member in the above-mentioned dotted line positions, the wedge member 29 may be allowed to roll sidewise along the triangular cross-section surface of the guiding way 33 whereby the shaft 8 and the disc member 5 may be allowed to rotate in the same direction as the handle 10 by an angular distance corresponding to the angular displacement of the handle so as to partially open the butterfly valve. Then, if the handle 10 and the lever 20 are quickly released from the gripping force acting on them, the leaf spring 27 immediately springs out to urge the lever 20 downwardly whereupon the lever 20, the wedge member 29, the shaft 8 and the disc member 5 are firmly held in their respective positions where these parts assume when the gripping force on the handle 10 and the lever 20 are removed therefrom whereby the butterfly valve may be firmly held in its partially opened position regardless of the pressure of the flowing high pressure hydraulic fluid acting thereon.

In operation, when the operator grips the handle 10 together with the lever 20 at the grip or rear handle portion 13 in his one hand and then increases his gripping on these parts so as to cause the lever 20 to pivot about the pivot pin 24 in the counter-clock direction against the force of the leaf spring 27 to the dotted line position of FIG. 6, for example, the frusto-conical wedge member 29 carried by the shorter lever arm 21 is also moved backwards along the longitudinally tapered surface of the guiding way 33 to the dotted-line position of FIG. 6, for example, whereby the wedge member can be released from the abutting or holding-down force by the brake disc 31. Then, when the operator turns the operation handle 10 in either direction while maintaining his gripping on the lever 20 in the doted line position of FIG. 6, the wedge member may be allowed to roll sidewise along the triangular cross-section transverse surface of the guiding way 33 and shaft 8 and the disc member 5 firmly connected to the shaft for rotation therewith may be caused to smoothly rotate in the same direction as the handle 10 by an angular distance corresponding to the angular displacement of the handle whereby the butterfly valve is opened (in the illustrated embodiment, it is assumed that when the lever 20 and wedge member 29 are in the dotted line positions of FIG. 6, the butterfly valve is partially opened). As soon as the butterfly valve was opened in the manner as mentioned just above, the operator quickly releases his grip on the handle 10 and the lever 20 which is now urging the longer lever arm 22 toward the top wall of the rear handle portion 13 whereupon the leaf spring 27 springs out to cause the lever 20 to pivot about the pivot pin 24 in the clockwise direction so as to urge the longer lever arm 22 downwardly whereby the frusto-conical wedge member 29 is urged forwards to regain its abutting relation to the underside of the brake disc 31 in a position laterally deviated from the position in which the wedge member was formerly abutted by the brake disc prior to the above mentioned operation. With the wedge member 29 abutted by the brake disc 31 again in the manner as mentioned just above, the handle 10, the lever 20, the shaft 8 and the disc member 5 can be firmly held in their respective positions in which they assume when the operator releases his grip on the handle 10 and the lever 20 whereby the butterfly valve may be positively maintained in its opened position.

Thus, it will be understood that in the butterfly valve which incorporates therein the novel handle braking device by the present invention, even when the component parts of the butterfly valve which are firmly held in position in the manner mentioned hereinabove may be accidentally subjected to any force which tends to displace them from their proper positions or relationship to the extent that the parts will come loose resulting in accidental rotation of the shaft and the disc member or even when the handle may be accidentally subjected to any force which tends to rotate the handle, since the frusto-conical wedge member 29 as held in position is designed to be forced to slidably move along the longitudinally tapered surface and to roll along the transversely sloped surface of the guiding way 33 in response to such accidental displacement of the butterfly valve parts or such accidental rotation of the handle while being firmly pinched between the brake disc 31 and the guiding way 33, the valve parts or the handle can be positively held in position against the force urging the same to displace and the valve can perform its function satisfactorily.

What I claim is:

1. A rotary valve comprising a hollow cylindrical flanged body to be connected at the opposite ends to pipes in a piping system adapted to transport hydraulic fluid under high pressure; a valve member rotationally disposed within said body for rotational movement between valve opening and closing positions, a shaft rotatably mounted in said body extending therefrom and extending diametrically of said body and valve member connected to said valve member and adapted to rotate about its longitudinal axis so as to rotate said valve member, and an elongated hollow manual operation handle rotationally mounted on said body snugly surrounding the portion of the vertical shaft extending from said body for rotating said shaft and valve member and laterally and horizontally extending from one side of the body; characterized by the provision of a braking device for said operation handle comprising a spring-loaded wedge actuating means pivoted to and within said handle in an intermediate portion between the opposite ends of the handle, wedge means carried by said wedge actuating means at one end of the latter for sliding movement in the longitudinal direction of said handle together with said wedge actuating means and for slidable lateral and rotational movement relative to said wedge actuating means, and a stationary brake disc held in position between said body and one end of said handle and adapted to releasably hold said wedge means in cooperation with said intermediate portion of the handle.

2. A rotating valve as set forth in claim 1, in which said operation handle consists of a fore end plate portion secured to said cylindrical body on the top thereof, an integral box-shape intermediate portion having a cross-section area which increases rearwardly and an integral rear end portion having a reversed U-shape cross-section, said intermediate handle portion having a wedge guiding way formed by the bottom wall thereof and having a tapered surface which is sloped rearwardly and downwardly in the longitudinal direction and outwardly and upwardly from the opposite sides of the lowest center in the transverse direction.

3. A rotary valve as set forth in claim 1, in which said spring-loaded wedge actuating means comprises a shorter arm formed at one end with a substantially semi-circular notch and an integral longer arm connected to the other end of said shorter arm and having one end of a leaf spring secured thereto the other end of which spring is anchored to the inner surface of the top wall of said rear handle portion and said lever being pivoted in the junction between said shorter and longer arms at a transverse pin extending transversely of and through the side walls of said intermediate handle portion.

4. A rotary valve as set forth in claim 2, in which said wedge means comprises a frusto-conical member the diameter of which increases from one end toward the other end in conformity with the taper of said guiding way in the longitudinal direction and the periphery of which is adapted at all times to rollably contact the transversely sloped surface of the guiding way in the transverse direction, said frusto-conical member being provided at a point between the opposite ends thereof with a constricted or reduced diameter neck portion adapted to be rotationally received within said notch in the shorter lever arm whereby the frusto-conical member may be slidably moved in the longitudinal direction of said intermediate handle section together with said lever and slidably rolled in the transverse direction of the intermediate handle portion relative to said lever.

5. A rotary valve as set forth in claim 1, in which said intermediate handle portion is further provided with a pair of aligned notches extending through the fore end wall of the handle portion into the side walls of the same handle portion for receiving the adjacent peripheral edge portion of said brake disc.

References Cited
UNITED STATES PATENTS

| | | | |
|---|---|---|---|
| 557,943 | 4/1896 | Bayley et al. | 251—110 XR |
| 1,870,557 | 8/1932 | Curd | 251—297 XR |
| 2,594,141 | 4/1952 | Feighner | 251—101 XR |
| 2,852,037 | 9/1958 | Downing et al. | 251—297 XR |
| 3,355,141 | 11/1967 | Cooper | 251—101 |

HENRY T. KLINSIEK, Primary Examiner

U.S. Cl. X.R.

251—110